US009623466B2

(12) United States Patent
Tofini et al.

(10) Patent No.: US 9,623,466 B2
(45) Date of Patent: Apr. 18, 2017

(54) BENDING ASSEMBLY AND METHOD THEREFOR

(71) Applicant: Aggressive Tube Bending Inc., Surrey (CA)

(72) Inventors: Yuri Fabrizio Tofini, Surrey (CA); Robert Wayne Georgison, Surrey (CA); Peter Wilhelm Diesing, Surrey (CA)

(73) Assignee: Aggresive Tube Bending Inc., Surrey (CA)

( * ) Notice: Subject to any disclaimer, the term of this patent is extended or adjusted under 35 U.S.C. 154(b) by 883 days.

(21) Appl. No.: 13/904,700

(22) Filed: May 29, 2013

(65) Prior Publication Data

US 2013/0319061 A1    Dec. 5, 2013

Related U.S. Application Data

(60) Provisional application No. 61/653,270, filed on May 30, 2012.

(51) Int. Cl.
*B21D 7/14* (2006.01)
*G05B 19/401* (2006.01)
*B21D 7/08* (2006.01)

(52) U.S. Cl.
CPC ............... *B21D 7/14* (2013.01); *B21D 7/08* (2013.01); *G05B 19/401* (2013.01)

(58) Field of Classification Search
CPC .......... B21D 5/004; B21D 5/006; B21D 7/08; B21D 7/085; B21D 7/14; B21D 9/10;

(Continued)

(56) References Cited

U.S. PATENT DOCUMENTS 3,396,565 A    8/1968 Miller
4,564,765 A    1/1986 Blaich
(Continued)

FOREIGN PATENT DOCUMENTS

CA    2136156    6/1995
EP    1875974    1/2008
(Continued)

OTHER PUBLICATIONS

Golkar et al., Real-Time Curvature Defect Detection on Outer Surfaces Using Best-Fit Polynomial Interpolation, Sensors 2012, Nov. 2, 2012, p. 14774-14791, ISSN 1424-8220.

(Continued)

*Primary Examiner* — Moshe Wilensky
*Assistant Examiner* — Pradeep C Battula
(74) *Attorney, Agent, or Firm* — Cameron IP

(57) ABSTRACT

The present invention relates to a bending assembly for bending a workpiece. The assembly includes a bending apparatus configured to bend the workpiece and form a curved portion of the workpiece. The curved portion of the workpiece has a longitudinal periphery and a curvature. The assembly includes a camera configured to produce an image of the longitudinal periphery of the curved portion of the workpiece. The assembly includes a processor configured to receive the image of the longitudinal periphery of the curved portion of the workpiece. The processor is configured to identify a plurality of measuring points spaced-apart along the longitudinal periphery of the curved portion of the workpiece. The processor is configured to determine the curvature of the curved portion of the workpiece based on the measuring points.

8 Claims, 17 Drawing Sheets

(58) Field of Classification Search
CPC .......... B21D 9/12; B21D 9/125; B21D 11/07; G05B 19/401; G05B 19/408; G05B 19/4086
See application file for complete search history.

(56) References Cited

U.S. PATENT DOCUMENTS

| | | |
|---|---|---|
| 4,947,666 A | 8/1990 | Hametner et al. |
| 5,046,852 A * | 9/1991 | Hametner ............... B21D 5/004 356/398 |
| 5,305,223 A | 4/1994 | Saegusa |
| 5,479,683 A | 1/1996 | Flemmer et al. |
| 5,531,087 A | 7/1996 | Kitabayashi et al. |
| 5,634,362 A | 6/1997 | Tomita |
| 6,161,408 A | 12/2000 | Ooenoki et al. |
| 6,662,610 B1 | 12/2003 | Sekita et al. |
| 6,708,541 B1 | 3/2004 | Matsumoto et al. |
| 6,807,835 B1 | 10/2004 | Sekita et al. |
| 7,489,412 B2 * | 2/2009 | Wamemunde ........... B21D 7/14 356/602 |
| 7,584,637 B2 * | 9/2009 | Ghiran .................... B21D 7/14 72/149 |
| 9,003,846 B2 * | 4/2015 | Isei ........................ B21B 1/22 72/11.2 |
| 2009/0120156 A1 | 5/2009 | Ikeda et al. |
| 2009/0178453 A1 | 7/2009 | Ghiran et al. |
| 2010/0095722 A1 | 4/2010 | Nishiura et al. |

FOREIGN PATENT DOCUMENTS

| | | |
|---|---|---|
| JP | 60236007 | 11/1985 |
| WO | 2012092909 A1 | 7/2012 |

OTHER PUBLICATIONS

International Search Report for PCT/CA2013/050698, dated Oct. 29, 2013.
English Abstract of JP 60236007 obtained from Espacenet on Aug. 2, 2012.
"COGNEX In-Sight® 5000 Series Vision System Installation Manual", In-Sight Vision Systems, 2011.
English Translation of WO 2012/092909.
Interntaional Preliminary Report on Patentability (Chapter II of the Patent Cooperation Treaty) for PCT/CA2013/050698, dated Oct. 15, 2015.

* cited by examiner

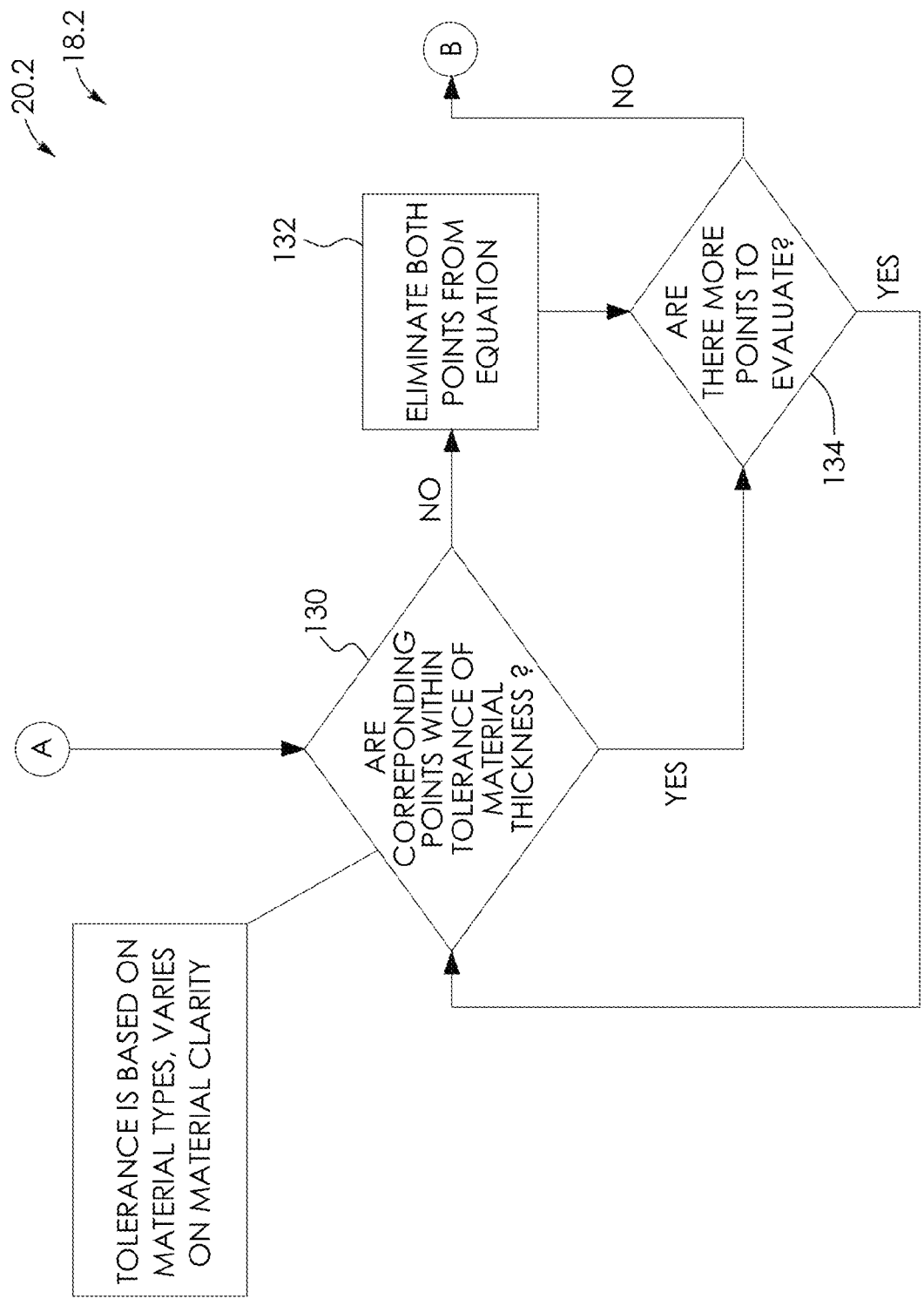

BENDING ASSEMBLY AND METHOD THEREFOR

CROSS REFERENCE TO RELATED APPLICATION

This application claims the benefit of provisional application No. 61/653,270 filed in the United States Patent and Trademark Office on May 30, 2012, the disclosure of which is incorporated herein by reference and priority to which is claimed.

FIELD OF THE INVENTION

The present invention relates to a bending assembly and method therefore. In particular, the invention relates to a bending assembly and a method therefore which utilizes a camera.

DESCRIPTION OF THE RELATED ART

U.S. Pat. No. 4,564,765 to Blaich provides an optoelectronic measuring method and an apparatus for measuring with optoelectronic instruments. The method includes directing one or two light rays of one or two light transmitters, such as lasers, at an acute angle onto a surface to be shaped. The distance covered from the starting position to the end position in the shaping operations is measured by means of a photodetector, e.g., a diode camera, which is set up perpendicular to the light spot or spots.

This method and apparatus, by deflecting light off of one or more point sources, may generate inaccurate determinations of angle and thus wrong die adjustment decisions when the surface to be shaped has bumps or finite imperfections.

U.S. Pat. No. 7,584,637 to Ghiran et al. provides a method of bending a metal object, such as a tube. The method provides using a real time, closed-loop feedback of the actual springback of the object in order to modify the applied bending force or preprogrammed bending coordinates so that the final desired bend geometry is achieved. The variability of springback from object to object is thus accounted for and the number of objects that must be scrapped due to incorrect bends (over bend or under bend) is reduced. The method is carried out using an apparatus such as a rotary draw bender with a measuring device operable to measure actual bend coordinates of metal objects bent by the bender. A controller is operatively connected to the bender and the measuring device and is configured to control the bender to bend the metal objects at least partly based on measured bend coordinates provided by the measuring device.

The above method and apparatus uses data to relate relative positions of the tube in its clamped and springback positions, such as using the view line of the camera, to measure an angle or distance between the positions. Here too such point measurements may be lead to inaccurate bend determinations.

BRIEF SUMMARY OF INVENTION

The present invention provides an improved bending assembly and method therefore as disclosed herein that overcomes the above set-out disadvantages.

There is accordingly provided a bending assembly for bending a workpiece. The assembly includes a bending apparatus configured to bend the workpiece and form a curved portion of the workpiece. The curved portion of the workpiece has a longitudinal periphery and a curvature. The assembly includes an image-capturing device configured to produce an image of the longitudinal periphery of the curved portion of the workpiece. The assembly includes a processor configured to receive the image of the longitudinal periphery of the curved portion of the workpiece. The processor is configured to identify a plurality of measuring points spaced-apart along the longitudinal periphery of the curved portion of the workpiece. The processor is configured to determine the curvature of the curved portion of the workpiece based on the measuring points.

The assembly may have a preprogrammed desired curvature for the curved portion. The processor may be configured to both compare the curvature with the preprogrammed desired curvature and output an adjustment command when the absolute value of the difference between the curvature and the desired curvature is greater than a set tolerance threshold. The bending apparatus may be configured to selectively alter the extent to which the workpiece is bent upon receiving the adjustment command.

According to another aspect, there is further provided a method of bending a workpiece using a bending apparatus, an image-capturing device and a processor. The method includes the step of bending a portion of the workpiece so as to form a curved portion of the workpiece. The curved portion of the workpiece has a longitudinal periphery and a curvature. The method includes the step of capturing an image of the longitudinal periphery of the curved portion of the workpiece with the image-capturing device. The method also includes the step of outputting the image of the longitudinal periphery of the curved portion of the workpiece to the processor. The method further includes the step of identifying through the processor a plurality of measuring points spaced-apart along the longitudinal periphery of the curved portion of the workpiece. The method yet further includes the step of determining through the processor the curvature of the curved portion of the workpiece based on the measuring points.

The bending apparatus may have a preprogrammed desired curvature for the curved portion and the method may further include the following steps: comparing through the processor the curvature of the curved portion with a desired curvature of the curved portion; and outputting from the processor to the bending apparatus an adjustment command when the absolute value of the difference between the curvature and the desired curvature is greater than a set threshold. The bending apparatus may alter the extent to which the workpiece is bent upon receiving the adjustment command.

BRIEF DESCRIPTION OF DRAWINGS

The invention will be more readily understood from the following description of preferred embodiments thereof given, by way of example only, with reference to the accompanying drawings, in which:

FIGS. 8a to 8c are flowcharts showing various steps in the operation of the bending assembly shown in FIG. 7;

DESCRIPTION OF THE PREFERRED EMBODIMENTS

Figure 1:
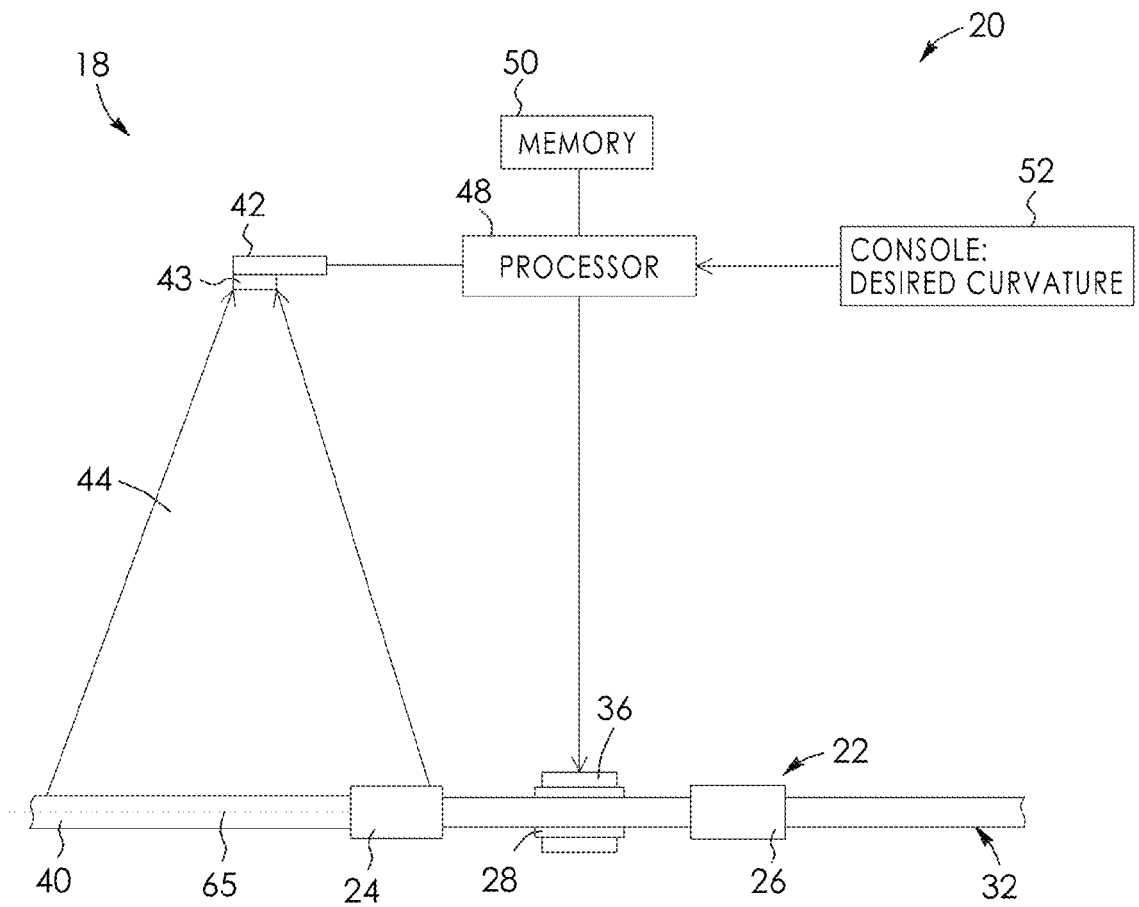
FIG. 1 is a diagrammatic side elevation view of a bending assembly, the assembly including a bending apparatus, tubing to be bent and a camera positioned above the tubing.
Figure 2:
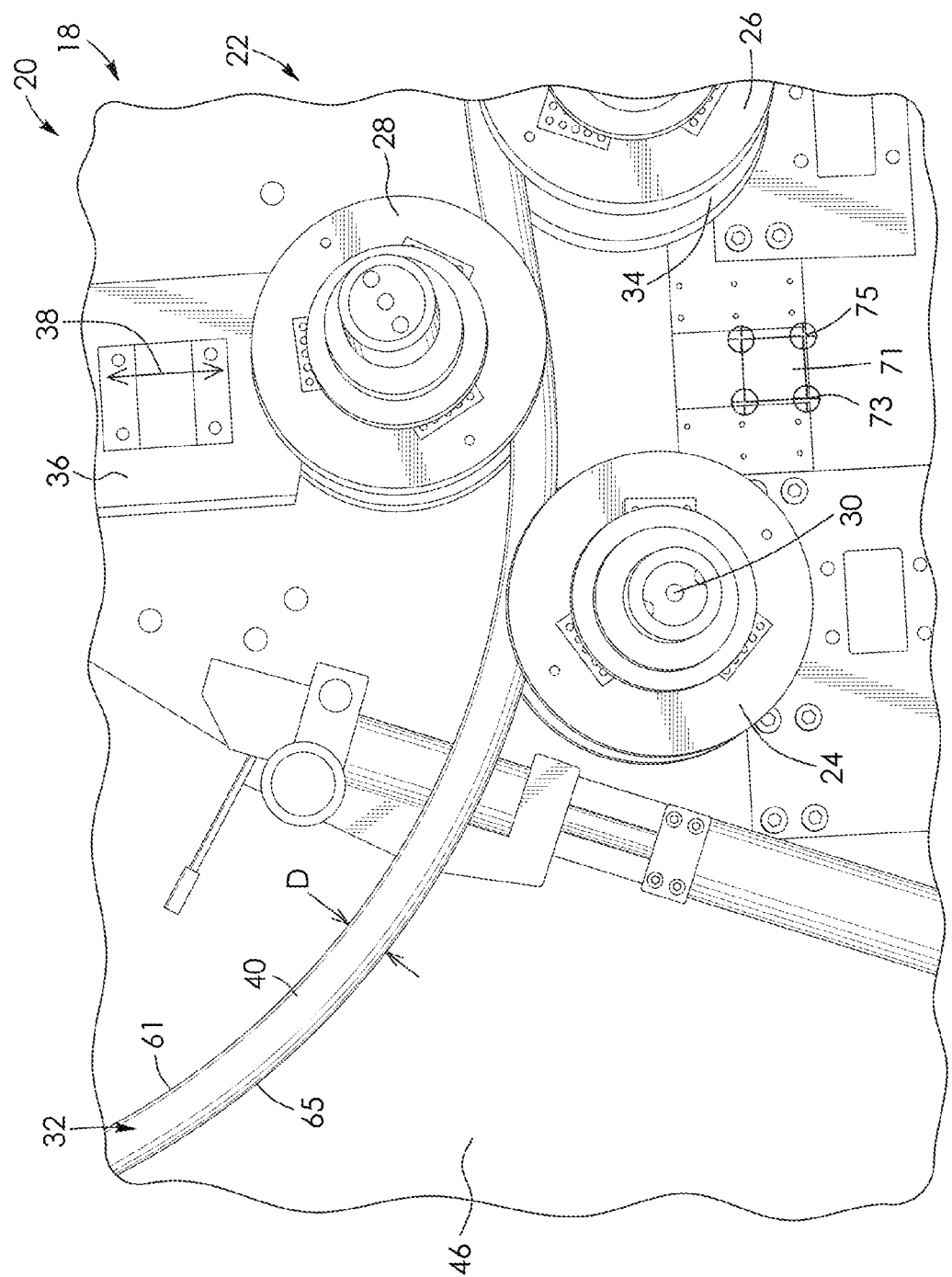
FIG. 2 is a camera image showing a top plan view of FIG. 1 of the bending apparatus and tubing shown in FIG. 1 as taken from the camera shown in FIG. 1.

Referring to the drawings and first to FIG. 1, there is provided a system 18 for bending a workpiece, in this example tubing 32, to a desired curvature. There is also provides a bending assembly 20 for bending the tubing. The assembly includes a workpiece bending apparatus, in this example a tube bending apparatus in the form of a three roll bending apparatus 22 in this embodiment, as best seen in FIG. 2. A three roll bending apparatus is not strictly required; for example, a four roll bending apparatus may be used in an alternative embodiment.

The bending apparatus has a plurality of rollers, including a pair of supporting, side rollers 24 and 26 and a bending roller 28. The rollers rotate about three spaced-apart and parallel longitudinal axes, as shown by axis 30 for roller 24. The rollers are configured to receive the workpiece to be bent, in this example metal tubing 32. Each of the rollers has a concave-shaped peripheral wall configured to receive the tubing, as shown by wall 34 for roller 26. The supporting rollers 24 and 26 align with each other and the bending roller 28 is interposed between the supporting rollers in this example. The rollers are configured such that tubing 32 is positionable between the bending roller 28 and the supporting rollers 24 and 26, respectively.

The bending apparatus 22 has an actuator 36 that is configured to selectively adjust the position of the bending roller relative to the supporting rollers, as shown by double-end arrow of numeral 38 in FIG. 2. The bending roller 28 is selectively adjustable so as to abut tubing 32 and cause the tubing to become curved as the rollers rotate the tubing through the bending apparatus 22. This is shown by curved portion 40 of the tubing 32 exiting from the rollers 24, 26 and 28 to the left from the point of view of FIG. 2. In another embodiment, one or more of side rollers 24 and 26 may powered instead of the roller 28. To this stage, the bending apparatus 22 is conventional, with its parts and functionings being well-known to those skilled in the art.

Referring back to FIG. 1, the system 18 and bending assembly 20 include an image-capturing device in this example an edge-detection camera 42 having a lens 43. According to one embodiment, the camera has at least five megapixels, and in this example is a COGNEX® In-Sight® 5600 Series camera, such as a 5615 series camera, though this is not strictly required and other edge-detection cameras may be used. These cameras have a 256 MB image processing memory, and a ⅔-inch CCD sensor type. Such cameras may be purchased by contacting Cognex Headquarters, Cognex Corporation, One Vision Drive, Natick, Mass. 01760-2059. The camera includes edge-detection software, in this example In-Sight® Explorer Software version 4.42.

Figure 3:
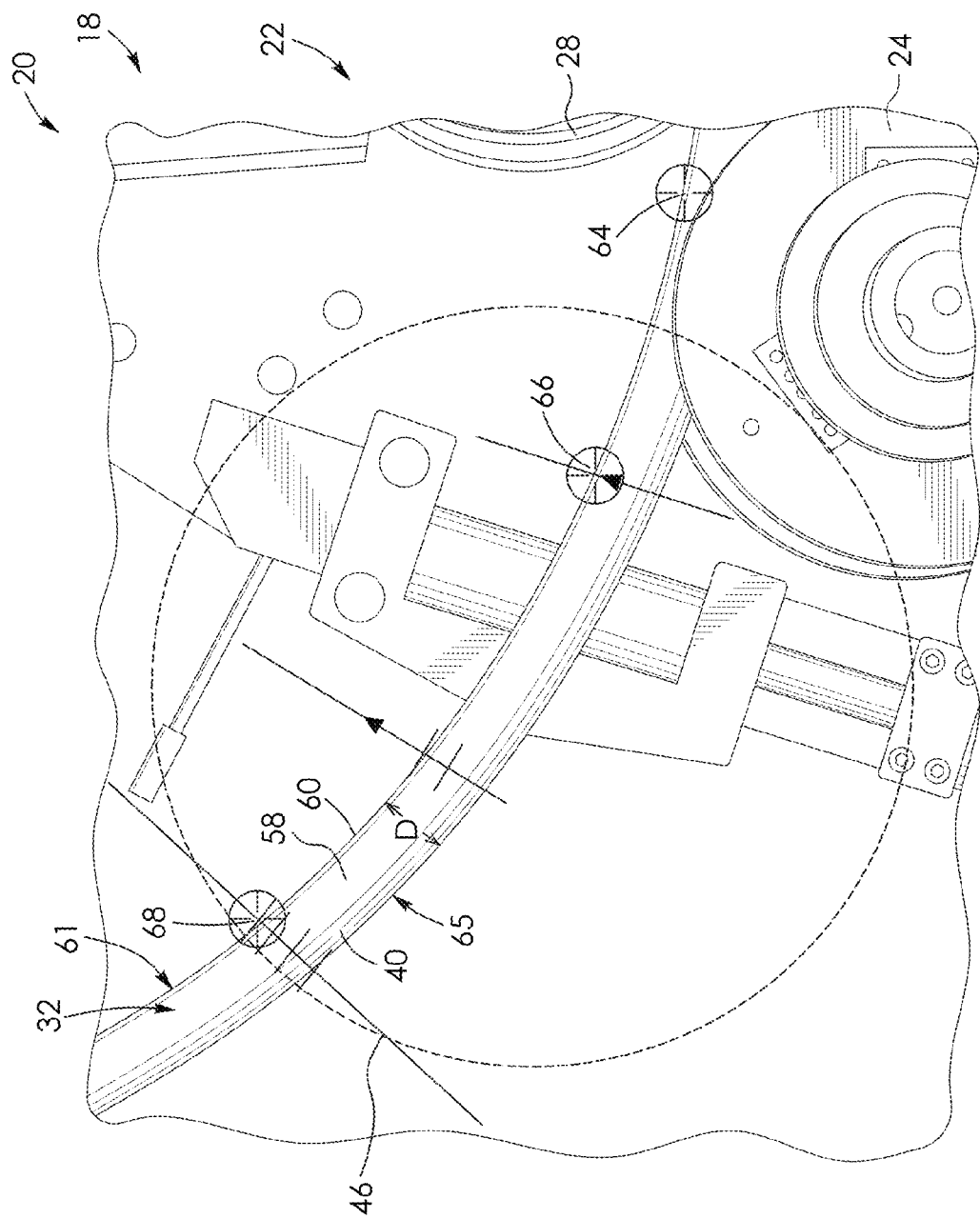
FIG. 3 is a camera image of an enlarged top plan view of the bending apparatus and tubing shown in FIG. 2.

The camera 42 is positioned so as to capture a span of light rays 44, shown in FIG. 1, corresponding to an image 46 of portion 40 of the tubing 32, together with roller 24 in this example, the image 46 being shown in FIG. 3. In this example, the camera 42 produces still images of the tubing during the bending process at a rate of approximately 10 images per second. However, this is not strictly required and images may be captured at other rates in other embodiments. Referring back to FIG. 1 and in this example, the camera is spaced-apart approximately eight feet above the rollers 24, 26, and 28, though this specific distance of separation is also not strictly required and the camera may be spaced-apart by other distances in other embodiments.

As seen in FIG. 1, the system 18 and bending assembly 20 further include a processor, in this example a microprocessor 48 operatively connected to the camera 42. The microprocessor is external to the camera in this example. The system 18 and assembly 20 includes a memory 50 operatively connected to the microprocessor, the memory being external to the microprocessor in this example. Captured images may be stored in and selectively accessible from the memory. The system 18 and assembly 20 include a control panel, in this example a console 52 operatively connected to the microprocessor 48. The microprocessor is operatively connected to the actuator 36 for selectively causing the actuator to position bending roller 28 as desired for selectively bending tubing 32.

Figure 5:
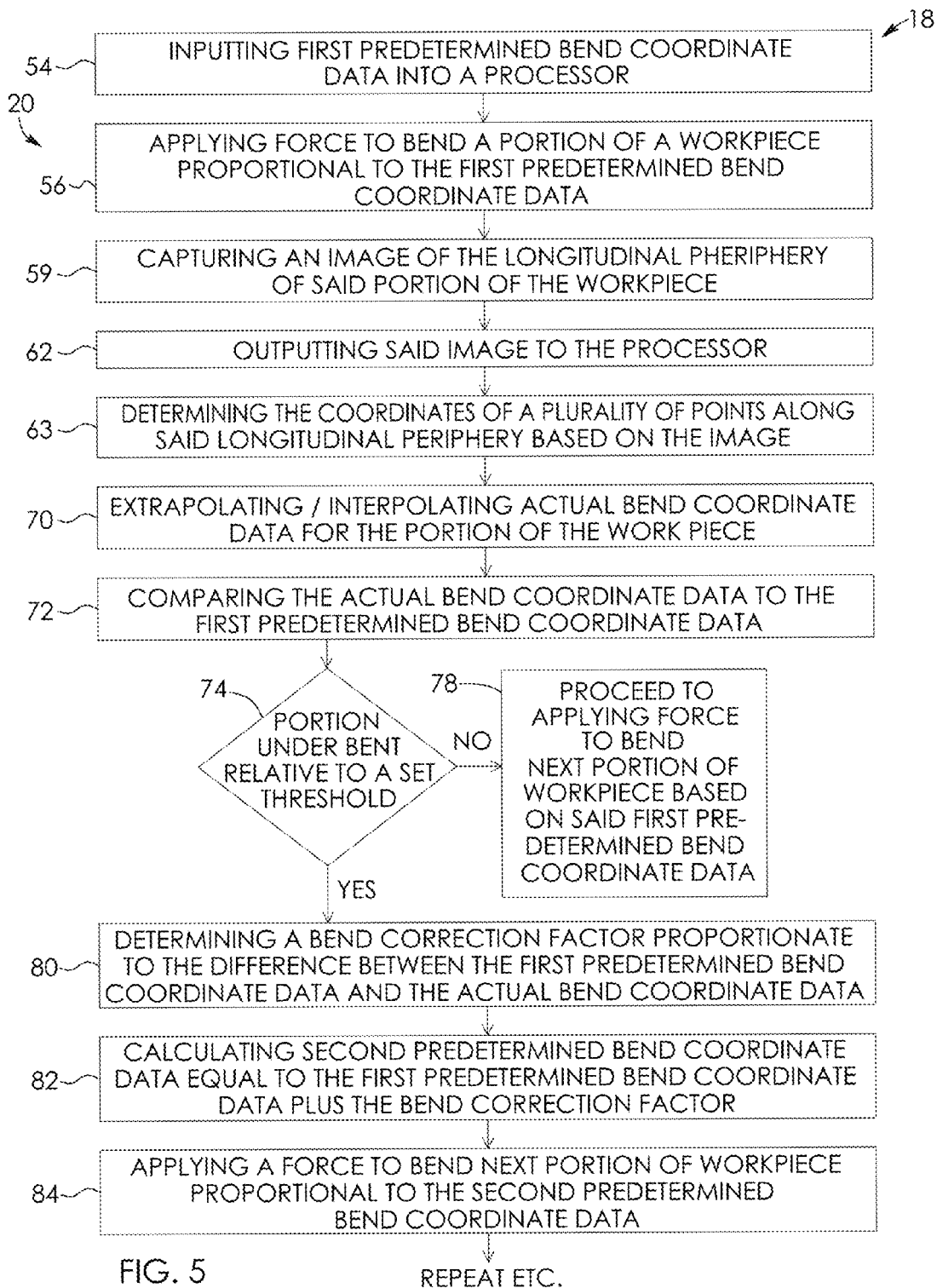
FIG. 5 is a flowchart showing various steps in the operation of the bending assembly shown in FIG. 1.

In operation and referring first to FIG. 2, tubing 32 is positioned between bending roller 28 and supporting rollers 24 and 26. Referring to FIGS. 1 and 5, a preprogrammed desired curvature for tubing 32 in the form of first predetermined bend coordinate data at 54, which may be stored within memory 50 seen in FIG. 1, is then inputted by a user into console 52, which is in turn communicated via a signal to the microprocessor 48. The first predetermined bend coordinate data may be stored within memory 50 shown in FIG. 1. Upon receiving this data at 54, the microprocessor 48 sends a signal to actuator 36 to move bending roller 28 into a position determined so as to apply a desired force against the tubing 32 and bend the tubing thereby as the rollers move the tubing through the bending apparatus 22. This force is proportional to the first predetermined bend coordinate data, as shown by box of numeral 56 in FIG. 5, and results in portion 40 of the tubing being bent, as seen in FIG. 2.

Referring to FIGS. 1, 3 and 5, camera 42 is configured to produce image 46 of the portion 40 of the tubing, as shown by box 59 in FIG. 5. As shown in FIG. 3, image 46 includes an image 58 of a first longitudinal periphery 60 of portion 40 which is representative of the curvature 61 of portion 40 of the tubing 32. Longitudinal periphery 60 aligns with and corresponds to the inside longitudinal curve or bent edge of the tubing formed by the bending and aligns with the inner radius of portion 40 in this example. Portion 40 of tubing 32 has a second longitudinal periphery 65 spaced-apart from and extending substantially in parallel with periphery 60. The second longitudinal periphery is angularly spaced-apart from periphery 65 by substantially 180 degrees and corresponds to an outer longitudinal curve or edge of the tube 32 formed by the bending. Lens 43 is positioned to align perpendicular to peripheries 60 and 65. Tubing 32 has an exterior diameter D seen in FIG. 2, which may be inputted by an operator via the console 52 and stored in memory 50 as seen in FIG. 1. The type of material may also be inputted into the console and stored into memory.

In this example, the Cognex® camera 42 has a built-in a data spreadsheet that outputs edge detection data. Image 58 is sent to the microprocessor 48, as shown by box 62 in FIG. 5. The microprocessor is configured to determine the coordinates of a plurality of measuring points spaced-apart along the longitudinal periphery 60 based on the image 58, as shown by box 63 in FIG. 5.

Figure 4:
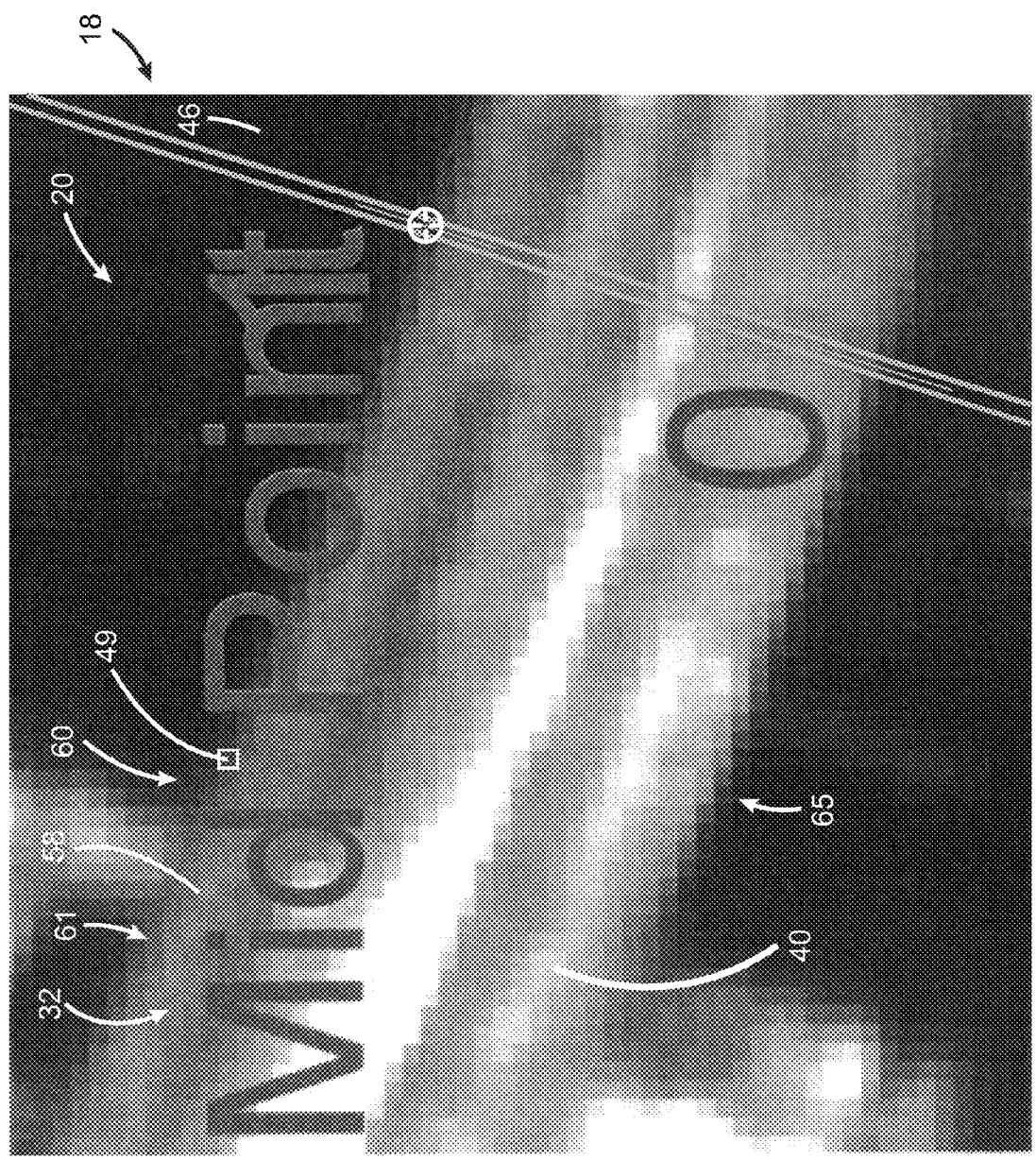
FIG. 4 is an enlarged top plan view being a further part of the camera image of the bending apparatus and tubing shown in FIG. 3.

Referring to FIG. 4, the processor locates the longitudinal periphery 60 of the curved portion 40 of the tubing 32 by identifying differences between adjacent pixels, such as pixel 49, on the image 46 that are equal to or greater than a threshold level of contrast.

Referring to FIG. 3, in this example measuring points along the longitudinal periphery are identified including a proximal point 64 adjacent to roller 24, a mid-point 66 and a distal point 68. The midpoint is interposed between the proximal point and the distal point. In other embodiments, more or fewer points may be identified. The microprocessor 48 identifies the points based on contrasts in the brightness and/or color of pixels 49 of image 46, as shown in FIG. 4. The microprocessor identifies differences between adjacent pixels which reach a certain pre-set threshold to locate longitudinal periphery 60 shown on the image. The longitudinal periphery is thus determined based on differences in brightness of pixels or the colors of pixels or both the colors and brightness of the pixels which reach said certain pre-set threshold. The image shown in FIG. 4 is by way of example only, and a higher resolution camera will provide yet further resolution and accuracy in its edge detection.

Referring to FIG. 5, the microprocessor next extrapolates, interpolates or both extrapolates and interpolates actual bending coordinate data for the portion 40 of the tubing 32, as shown by box 70, to determine an approximation of the actual curvature of the curved portion of the tubing based on the measuring points. In this example, the microprocessor uses points 64, 66 and 68, shown in FIG. 3, to determine a virtual center of a circle formed by curved portion 40. The microprocessor next calculates an averaged distance of separation, or radius, between the points and the virtual center of the circle. The distance of separation is then translated into an actual, real world distance. This is performed by placing an object of known length within the image frame of the camera, in this example a square object 71 seen in FIG. 2 such as a Post-It® note.

The distance between adjacent points 73 and 75 of the object 71 is compared to the stored, known actual length of the object to determine a correction factor. The microprocessor multiplies this correction factor against the distance of separation between the points 64, 66 and 68 and the virtual center to determine the actual distances of separation and actual bending coordinate data, such as the actual bend radius of portion 40 of tubing 32.

Referring back to FIG. 5, as shown by box 72, the microprocessor next compares the actual bending coordinate data to the first predetermined bend coordinate data 54. The microprocessor then compares this difference in resulting values to a set tolerance threshold stored within memory 50. If portion 40 of tubing 32 seen in FIG. 2 is not underbent at 74 relative to the set tolerance threshold, then the rollers 24, 26 and 28 of the assembly 20 continue to pass the tubing 32 through the bending apparatus 22 to bend a next portion of the tubing based on the first predetermined bend coordinate data. This is shown by box 78.

If portion 40 of the tubing 32 seen in FIG. 2 is underbent, then the microprocessor determines a bend correction factor proportionate to the difference between the first predetermined bend coordinate data and the actual bend coordinate data, as shown by box 80 in FIG. 5. The microprocessor then calculates second predetermined bend coordinate data that is equal to the first predetermined bend coordinate data plus the bend correction factor, as shown by box 82. The second predetermined bend coordinate data may be stored within memory 50 shown in FIG. 1.

The microprocessor uses the second predetermined bend coordinate data to output an adjustment command when the absolute value of the difference between the actual curvature of portion 40 of the tubing 32 and the desired curvature of the portion of the tubing is greater than the set tolerance threshold. The actuator 36 selectively alters positioning of roller 28 upon receiving the adjustment command and the bending apparatus is thus configured to alter the extent to which the workpiece is bent upon receiving this adjustment command. Put another way, the microprocessor sends a signal to the actuator 36 seen in FIG. 1 so as to operatively cause the actuator to adjust the position of bending roller 28.

The actuator so adjusted applies a tailored force against the next portion of tubing 32 to bend the next portion of the tubing thereby as the rollers move the tubing through the bending apparatus 22. This is shown by box 84. This tailored force is proportional to the second predetermined bend coordinate data and results in the next portion of the tubing being bent in a manner that is a closer approximation of the desired curvature of the tubing 32. This feedback loop as herein described may be repeated until no more bend correction factors are calculated or needed.

Figure 6:
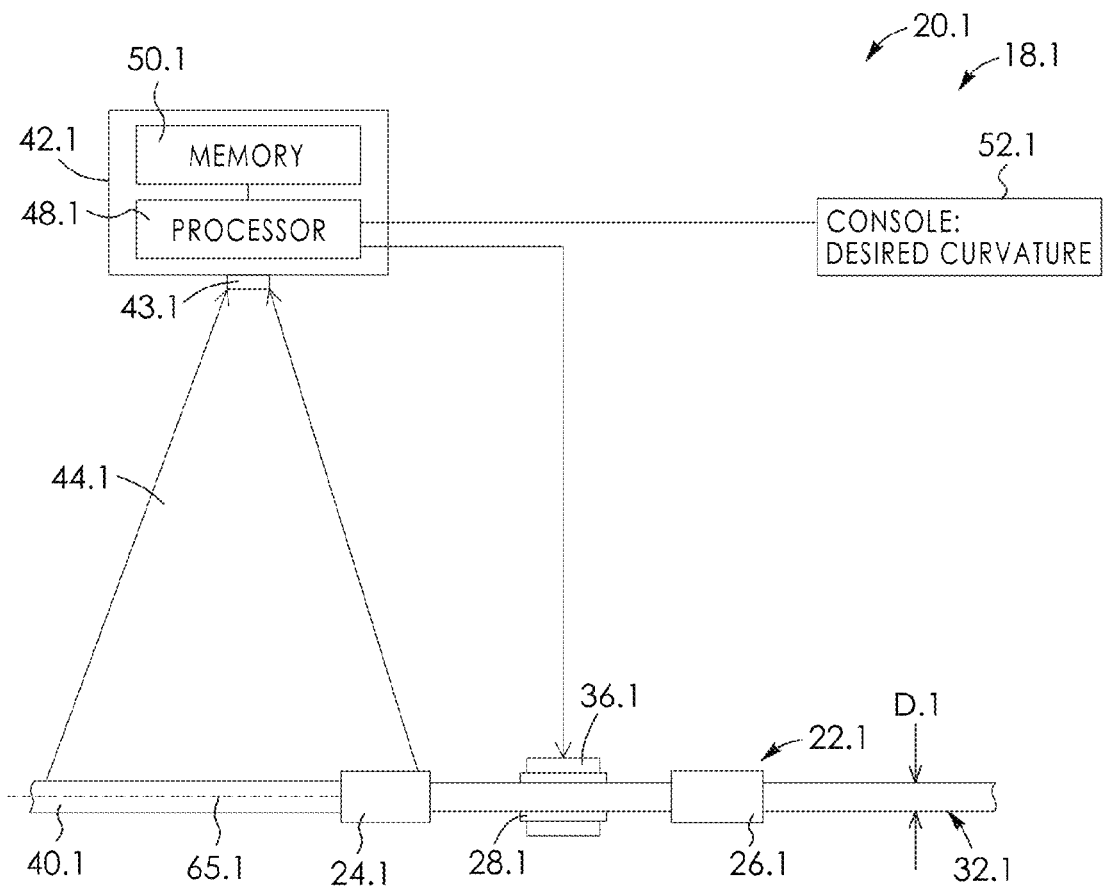
FIG. 6 is a diagrammatic side elevation view of a bending assembly according to a second aspect.

FIG. 6 shows a system 18.1, bending assembly 20.1 and bending apparatus 22.1 according to a second aspect. Like parts have like numbers and functions as the system 18, assembly 20 and apparatus 22 shown in FIGS. 1 to 5 with the addition of ".1". System 18.1, assembly 20.1 and apparatus 22.1 are substantially the same as system 18, assembly 20 and apparatus 22 shown in FIGS. 1 to 5 with the exception that microprocessor 48.1 and memory 50.1 are integral with camera 42.1.

FIGS. 7 to 13 show a system 18.2, bending assembly 20.2 and bending apparatus 22.2 according to a third aspect. Like parts have like numbers and functions as the system 18, assembly 20 and apparatus 22 shown in FIGS. 1 to 5 with the addition of ".2". System 18.2, assembly 20.2 and apparatus 22.2 are substantially the same as system 18, assembly 20 and apparatus 22 shown in FIGS. 1 to 5 with the following exceptions.

Assembly 20.2 has a frame 86 that includes a vertical part 88 having a plurality of trusses 90 and in this example a horizontal part 92 extending outwards from the top of vertical part. The horizontal part of the frame has a first end 94 connected to the vertical part of the frame, a second end 96 which is spaced-part from the first end and in this example has a pair of telescoping slide rails 98 interposed between ends 94 and 96. The frame 86 includes an elongate supporting member 100 that connects to end 96 and extends in a transverse direction relative to horizontal part 92 of the frame. The supporting member has a first end 102 upon which camera 42.2 is mounted and a second end 104 which is spaced-apart from end 102.

The assembly 20.2 includes a light apparatus, in this example an LED light array 106. The light array is positioned to emit diffuse light onto tube 32.2 including its curved portion 40.2. According to one preferred example, the array emits red light and the camera 42.2 may include a filter 91, seen in FIG. 7, which filters all but red light. This may be particularly beneficial for materials that are generally not very shiny. However, red light is not strictly required and different colored light may be used for different types of materials. The light also may be an infrared light according to another example. Array 106 is configured to provide a consistent look to the workpiece regardless of the ambient light in the environment of the assembly 20.2.

Figure 7:
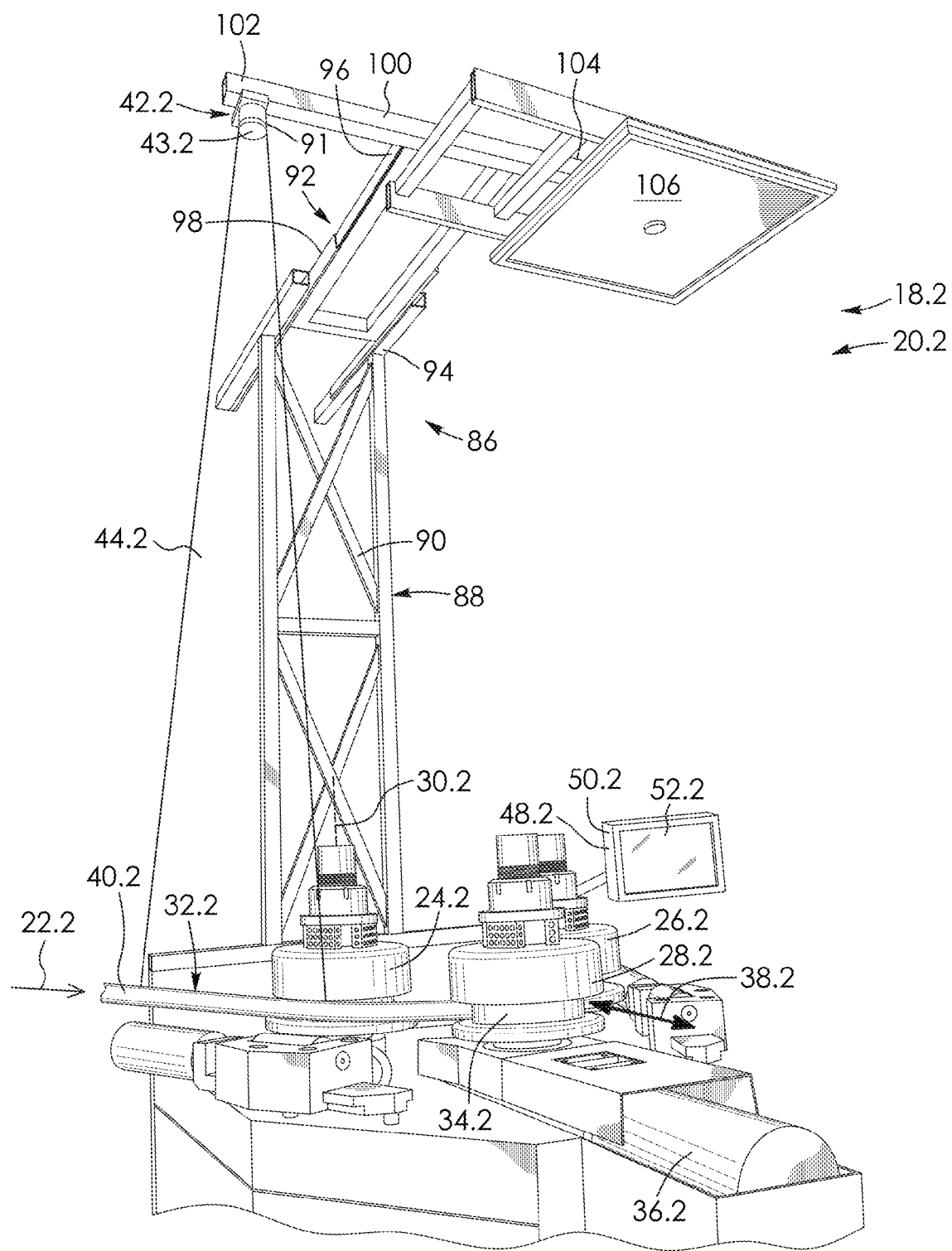
FIG. 7 is a side perspective view of a bending assembly according to a third aspect, including a bending apparatus, tubing to be bent and a camera positioned above the tubing.
Figure 8A:
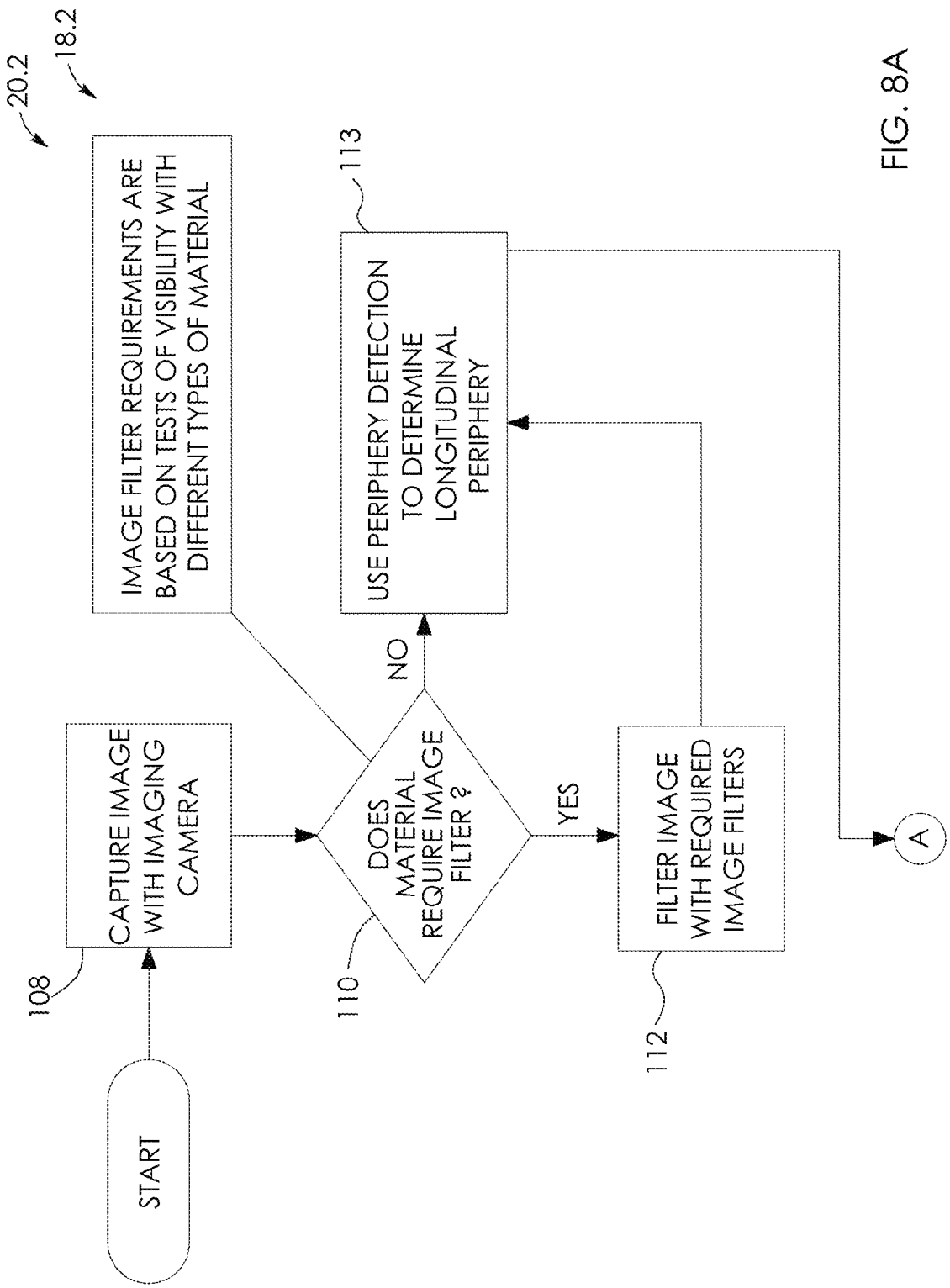
Figure 8C:
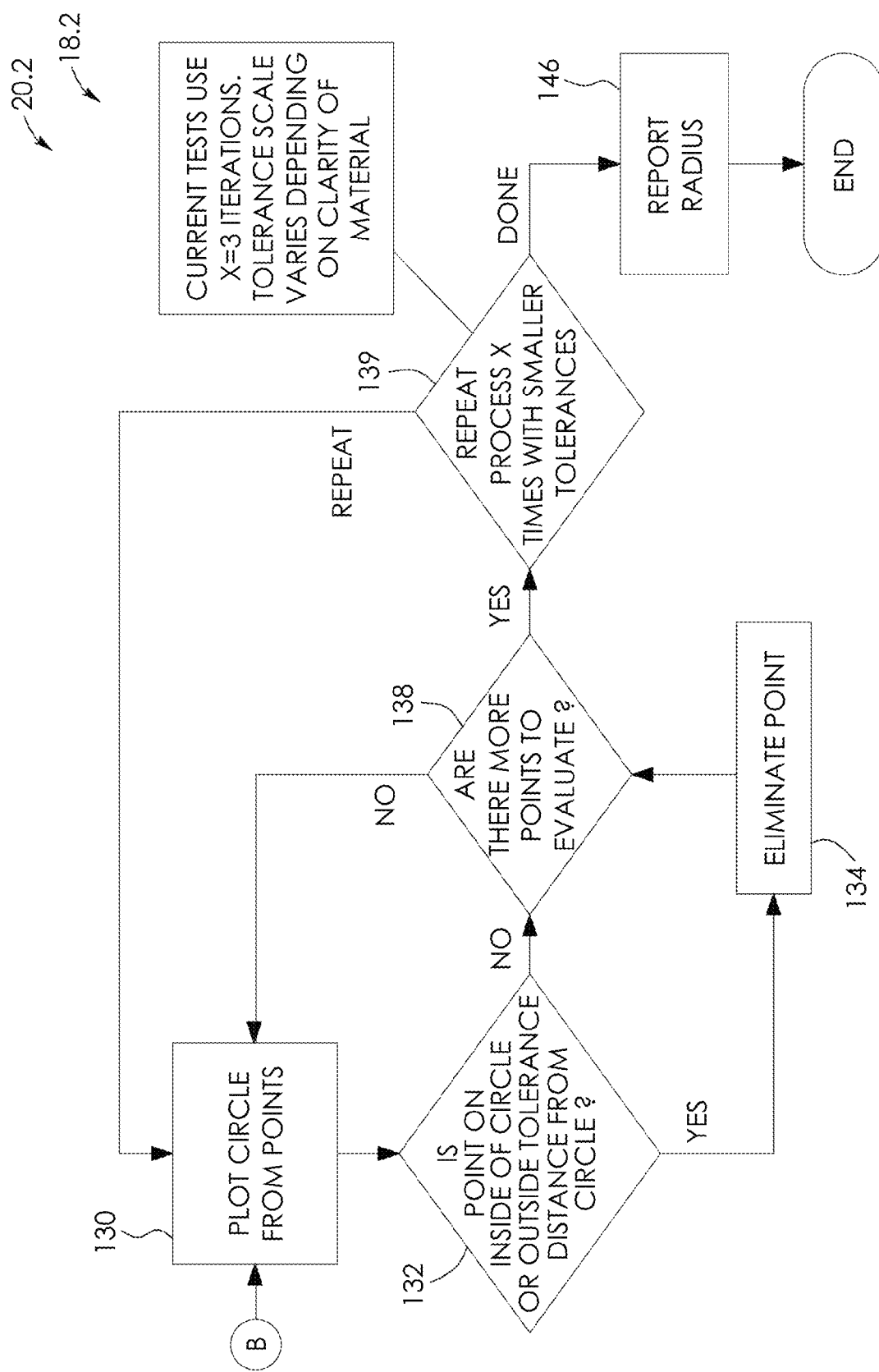
Figure 9:
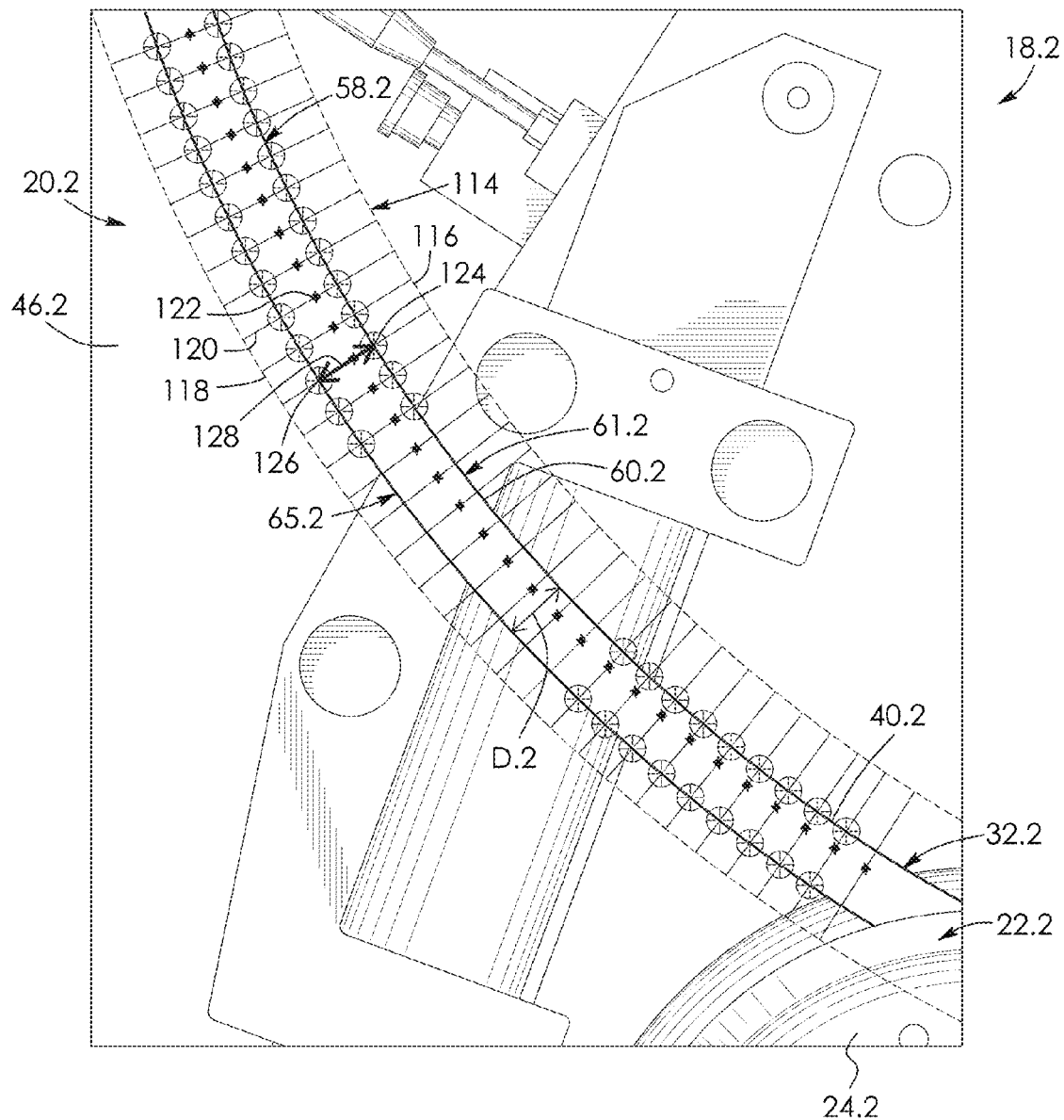
FIG. 9 a top plan view as taken from the camera of FIG. 7 of the bending apparatus and tubing shown in FIG. 7 as taken from the camera shown in FIG. 7, the image having a plurality of measuring points.
Figure 10:
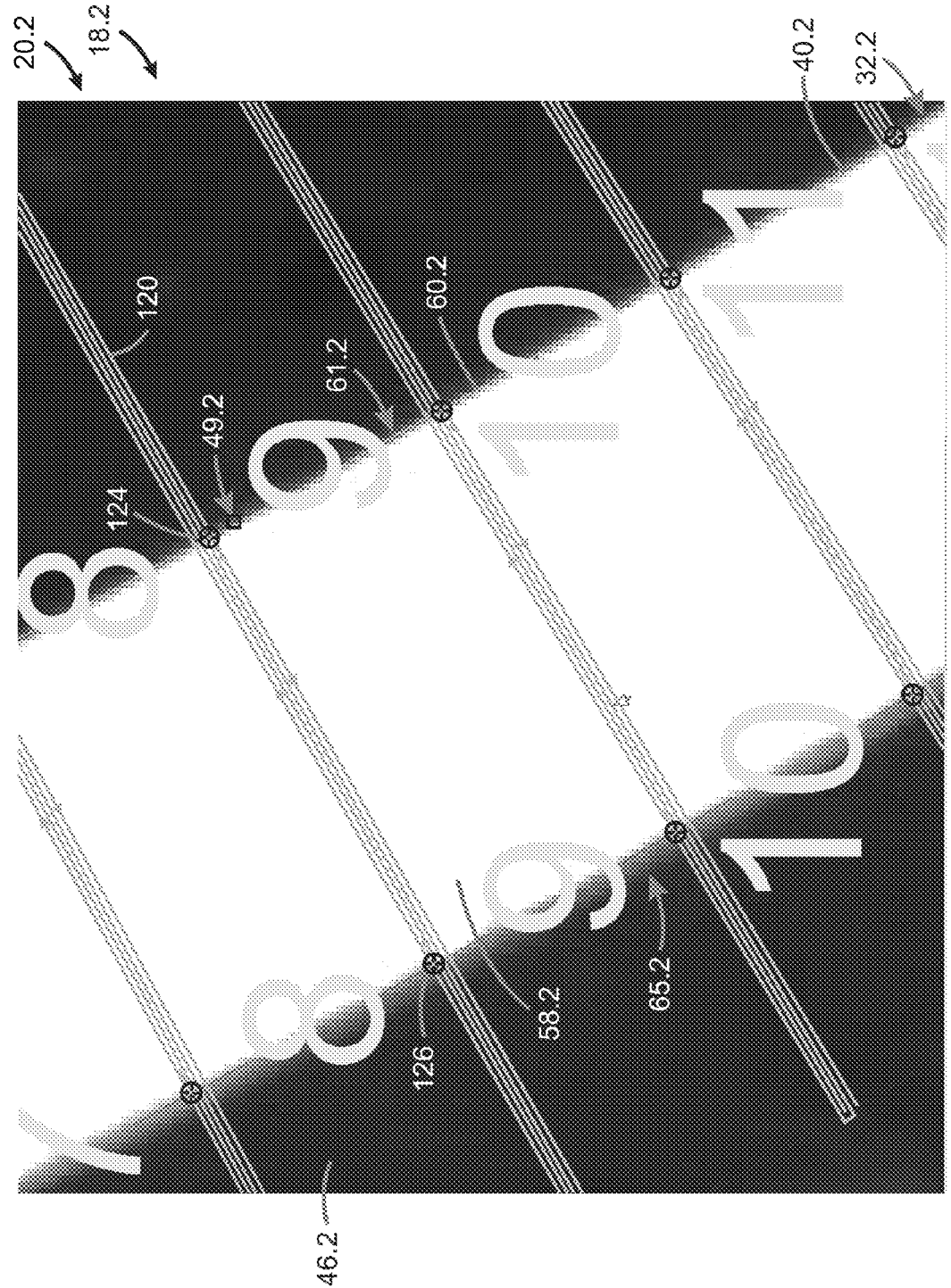
FIG. 10 is an enlarged top plan view of a further part of the camera image of the bending apparatus and tubing shown in FIG. 9.

FIGS. 8A to 8C show an algorithm for system 18.2. In use and referring to FIGS. 8A and 9, system 18.2 functions by first capturing image 46.2 with camera 42.2 seen in FIG. 7, as shown in FIG. 8A by box 108. The microprocessor 48.2 next determines if the image needs to be filtered, as shown by box 110. This determination is based on prior tests of visibility for different types of materials, for example, and comparing these stored results with the material inputted into console 52.2 seen in FIG. 7. If filtering is needed, the image is filtered with a given image filter as shown by box 112. In either case, edge detection, as shown by box 113, is next used by the microprocessor 48.2 to locate the longitudinal peripheries 61.2 and 65.2 of portion 40.2 of tubing 32.2 as seen in FIG. 9. The camera in this example overlays grid indicia 114 onto the image 46.2. The grid indicia is arcuate shaped in this example and is prepositioned to encompass portion 40.2 of the tubing 32.2 within its boundaries. The grid indicia 114 comprises a pair of spaced-apart arcuate-shaped line indicia 116 and 118 configured to be approximate to the desired curvature of the tubing and which are parallel with each other in this example. The grid 114 includes a plurality of transverse line indicia 120 extending between and, in this example, perpendicular to, indicia 116 and 118. The grid indicia 114 includes a plurality of midpoints 122 located along each indicia 120 between indicia 116 and 118. The shape of the grid indicia may be pre-set and determined based on the user's input of the type of material to be bent. In this example, the grid indicia may be 24 inches in length, though this is not strictly required.

The microprocessor 48.2 next identifies a first plurality of spaced-apart measuring points, as shown by point 124, along the first longitudinal periphery 61.2 of portion 40.2 of tubing 32.2. The microprocessor also identifies a second plurality of spaced-apart measuring points, as shown by point 126, along the second longitudinal periphery 65.2 of the portion of the tubing. In each case, the microprocessor focuses on that portion of the image 46.2 within grid indicia 114. The location of the measuring points is determined based on determination of by identifying differences between adjacent pixels, as seen by pixel 49.2 in FIG. 10, on the image 46.2 that are equal to or greater than a threshold level of contrast. In this example, there are initially 32 measuring points, thought this is not strictly required.

Referring to FIGS. 8B and 9, the system 18.2 next determines the distance of separation 128 between respective ones of the measuring points 124 and 126 so paired, after taking into account a correction factor substantially similar to that for system 18 shown in FIGS. 1 to 5. Referring to FIG. 8B, the microprocessor determines whether the distance of separation is equal to the diameter D of the tubing 32.2 within a pre-set tolerance, as shown by box 130.

If distance 128 in FIG. 9 is not equal to diameter D within the pre-set tolerance, both points 124 and 126 are eliminated or are disregarded by the microprocessor, as shown by box 132 in FIG. 8B. If the distance of separation is equal to the diameter of the tubing within the pre-set tolerance, the points are retained and the microprocessor determines if there are other pairs of measuring points. If such pairs are found, then these are then analysed, as shown by box 134.

Figure 11:
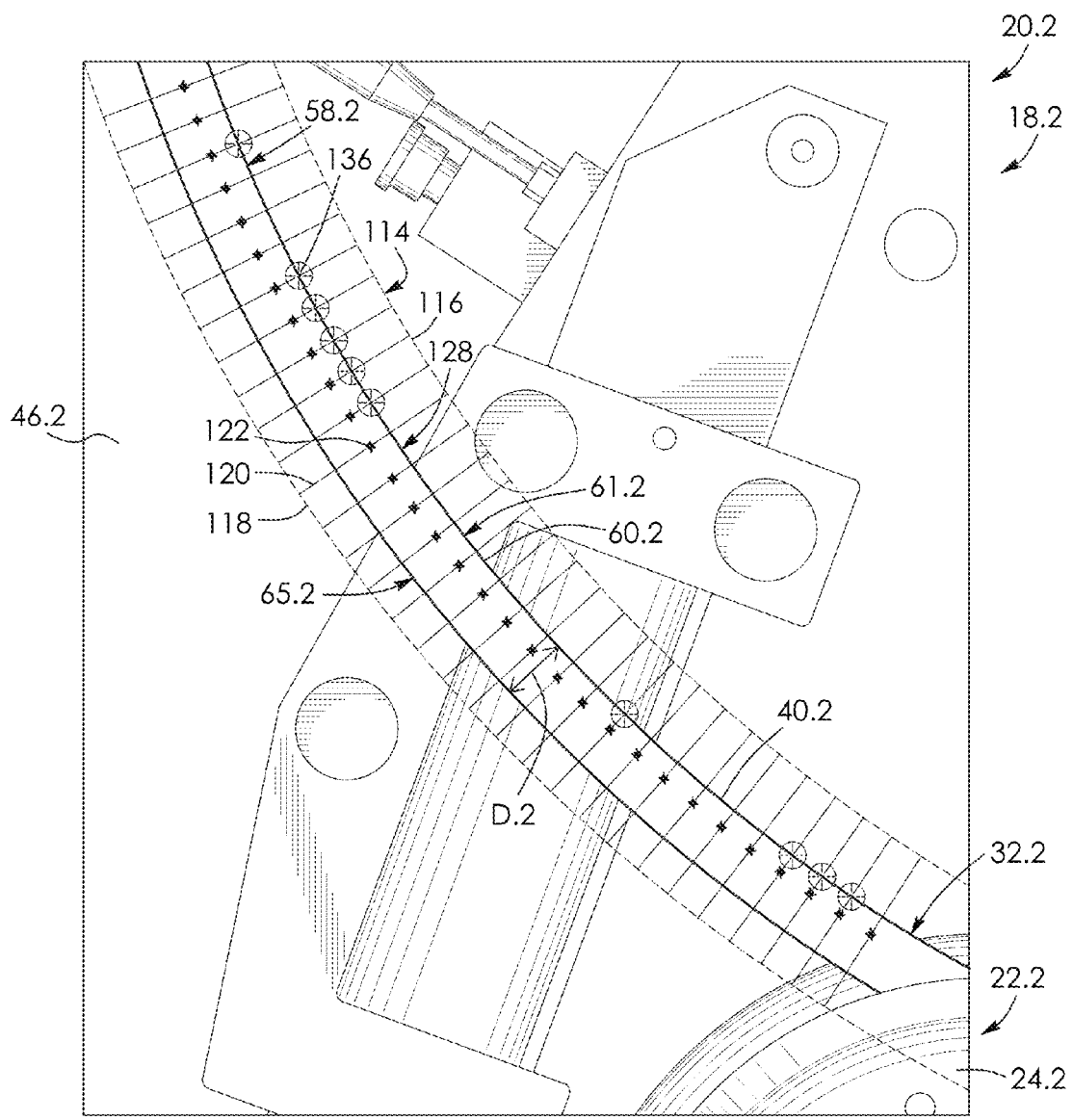
FIG. 11 is a top plan view as taken from the camera of FIG. 7 of the bending apparatus and tubing shown in FIG. 7 taken from the camera shown in FIG. 7, showing a select number of measuring points that fit along a first estimated curvature within a first pre-set tolerance.

Once all of the pairs of measuring points 124 and 126 have been analyzed, the microprocessor then determines a first estimated curvature 128, seen in FIG. 11, based on the measuring points 124 so retained corresponding to periphery 61.2. This step is generally shown by box 130 in FIG. 8C.

The system 18.2 next determines whether a given measurement point 124 so retained fits along the first estimated curvature 128 within or outside a first pre-set tolerance and whether the point is on the inside or outside of the first estimated curvature, as shown generally by box 132. Those points that both do not fit within the first pre-set tolerance and which are inside of the first estimated curvature are discarded, as shown by shown by box 134. Those measuring points, such as point 136 shown in FIG. 11, positioned between the portion of the image showing the tubing 32.2 and the first estimated curvature 128, are retained. The first pre-set tolerance is equal to or less than one pixel in this example.

Figure 12:
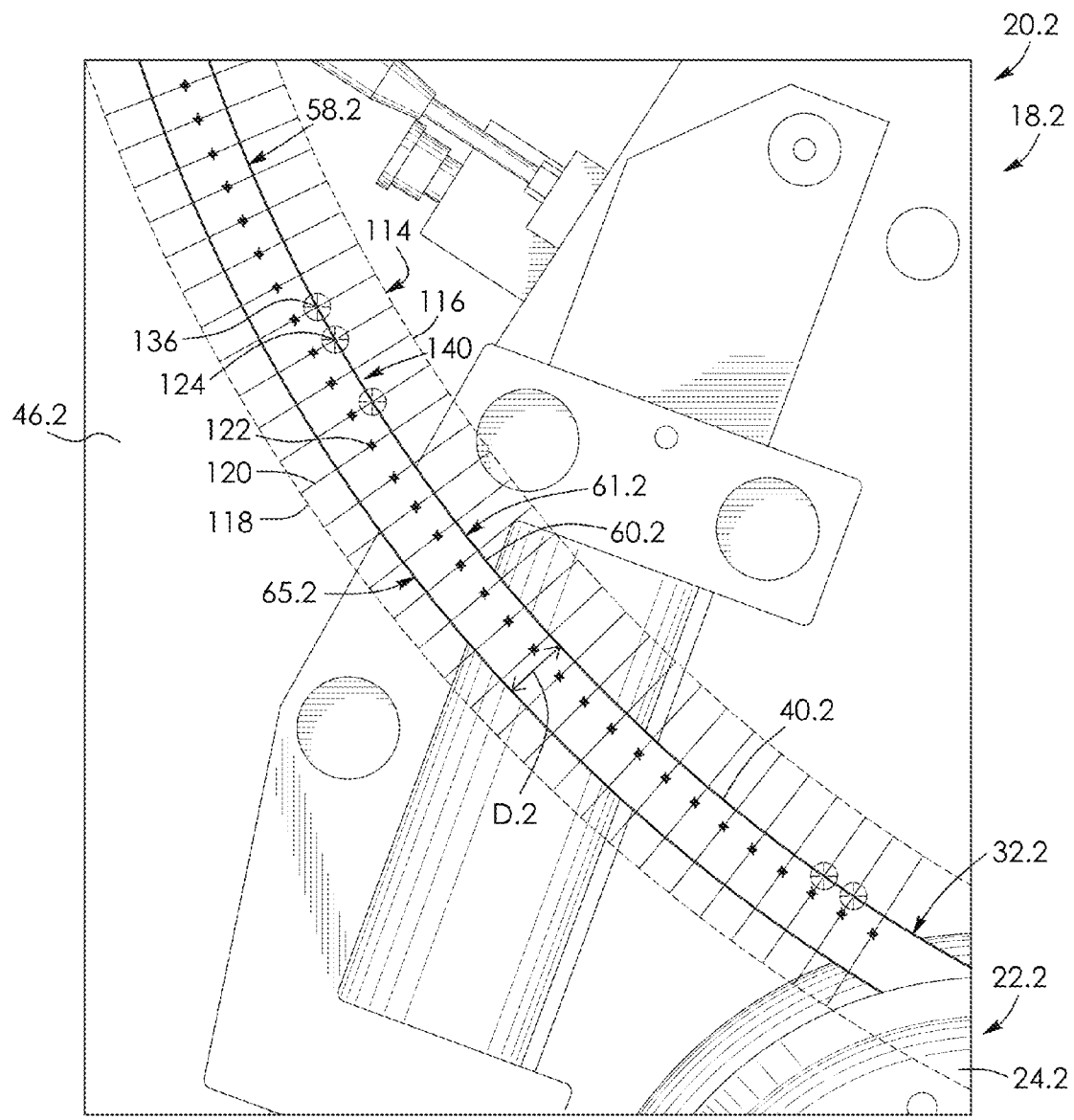
FIG. 12 is a top plan view as taken from the camera of FIG. 7 and similar to FIG. 11, showing a refined number of measuring points that fit along a second estimated curvature within a second, narrower pre-set tolerance.
Figure 13:
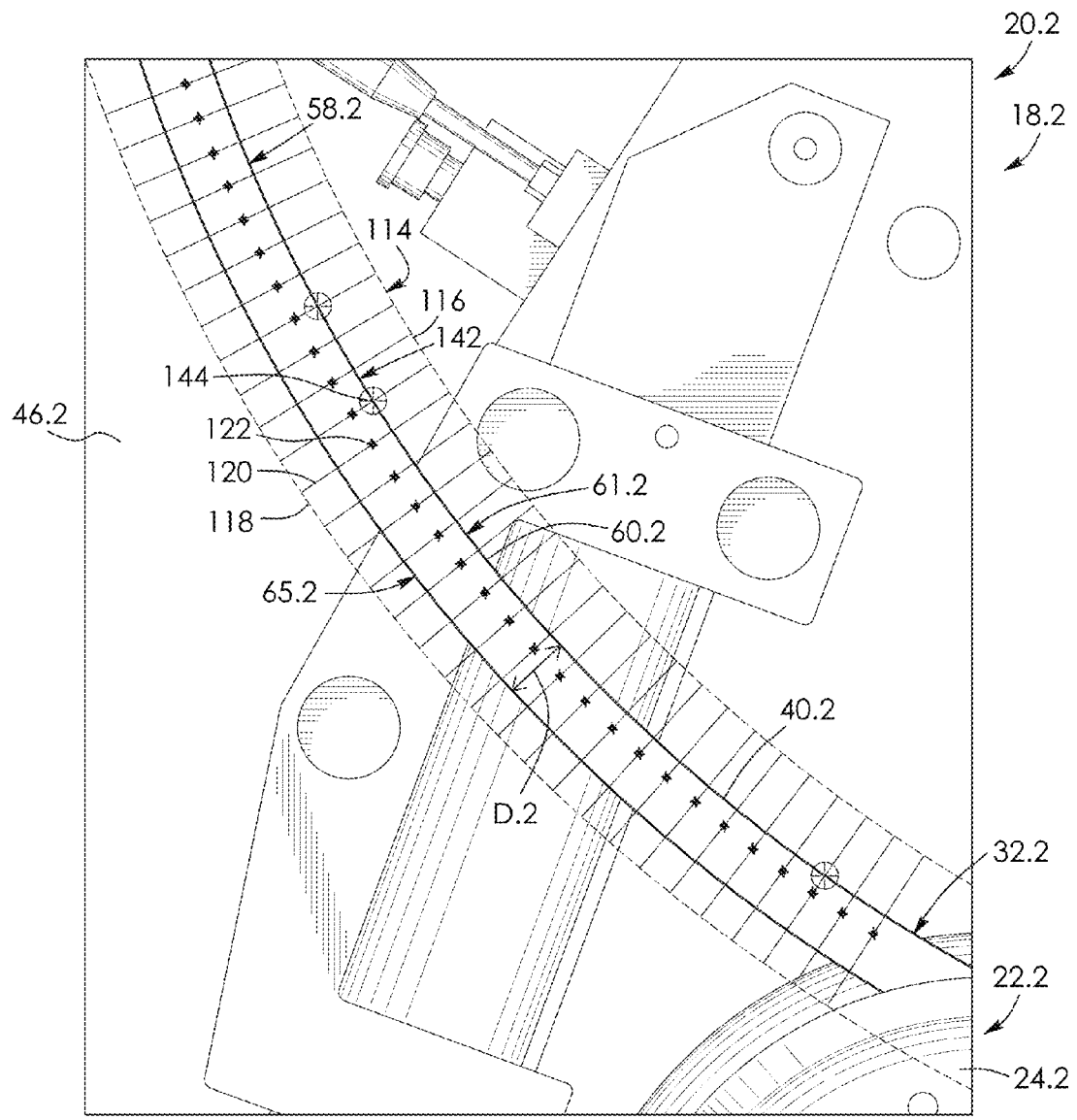
FIG. 13 is a top plan view as taken from the camera of FIG. 7, showing a further refined number of measuring points that fit along a third estimated curvature within a third, yet narrower pre-set tolerance.

If the microprocessor next determines if there are more points to analyze, as shown by box 138 in FIG. 8C. If not, then steps 130 to 138 are repeated for progressively reduced pre-set tolerances, as shown by box 139 in FIG. 8C. This is shown in FIG. 12 by a second estimated curvature 140 determined based on points such as point 136 which fit within a second pre-set tolerance that is narrower than the first pre-set tolerance. The second pre-set tolerance is equal to or less one half of a pixel in this example. A third estimated curvature 142 may then be determined based on points 144 seen in FIG. 13 which fit within a third pre-set tolerance that is narrower than the second pre-set tolerance. The third pre-set tolerance is equal to or less than one quarter of a pixel. After the x number of iterations and estimated curvatures and progressively tighter pre-set tolerances have been processed, the curvature 61.2 of the tubing 32.2 as determining by the system 18.2 is obtained, as shown by box 146 in FIG. 8C. This may be used to adjust the positioning of the bending apparatus 22.2 in real time as has been previously described above, thereby allowing the system 18.2 to bend and continually test the workpiece so bent for accuracy. The system as herein described determines curvatures of workpieces based on multipoint analysis and in a touchless manner. This thereby reduces the distortion effects that imperfections in the outer surface of a given material may otherwise cause.

Figure 14:
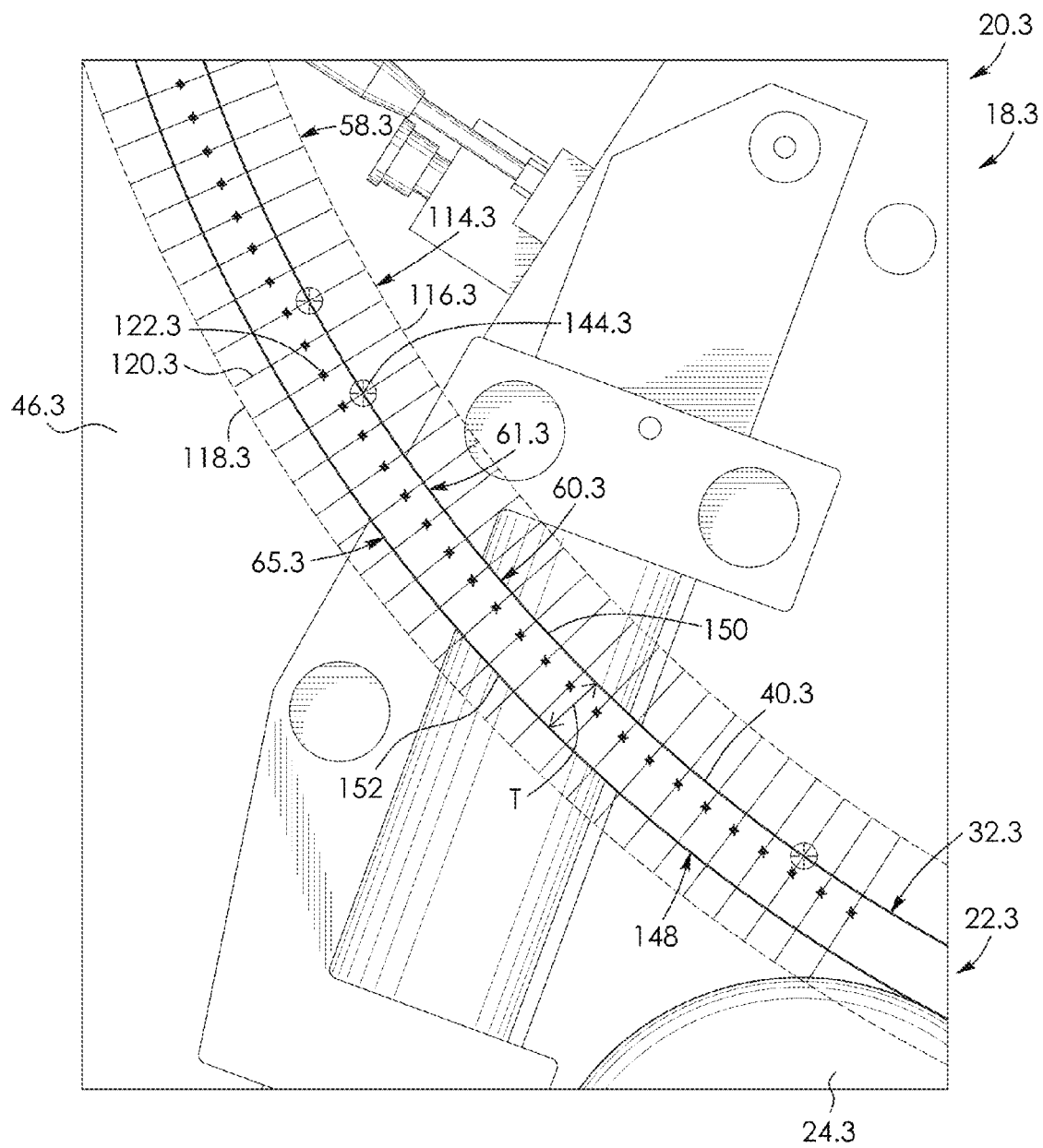
FIG. 14 is a top plan view as taken from the camera of FIG. 7 of the bending apparatus and a metal sheet for a bending assembly according to a fourth aspect.

FIG. 14 shows a system 18.3, bending assembly 20.3 and bending apparatus 22.3 according to a fourth aspect. Like parts have like numbers and functions as the system 18.2, assembly 20.2 and apparatus 22.2 shown in FIGS. 7 to 13 with the decimal extension ".3" replacing decimal extension ".2" and being added to numbers shown in FIGS. 7 to 13 not previously having decimal extensions. System 18.3, Assembly assembly 20.3 and apparatus 22.3 are substantially the same as system 18.2, assembly 20.2 and apparatus 22.2 shown in FIGS. 7 to 13 with the exception that the workpiece is in the form of a metal sheet 148 in this example. The metal sheet has a thickness T, a first planar surface 150, and a second planar surface 152 spaced-apart from surface 150. The thickness of the sheet extends between and is perpendicular to surfaces 150 and 152. The peripheries 61.3 and 65.3 of the sheet 148 correspond to the inner and outer longitudinal edges of the surfaces 150 and 152, respectively.

Figure 15:
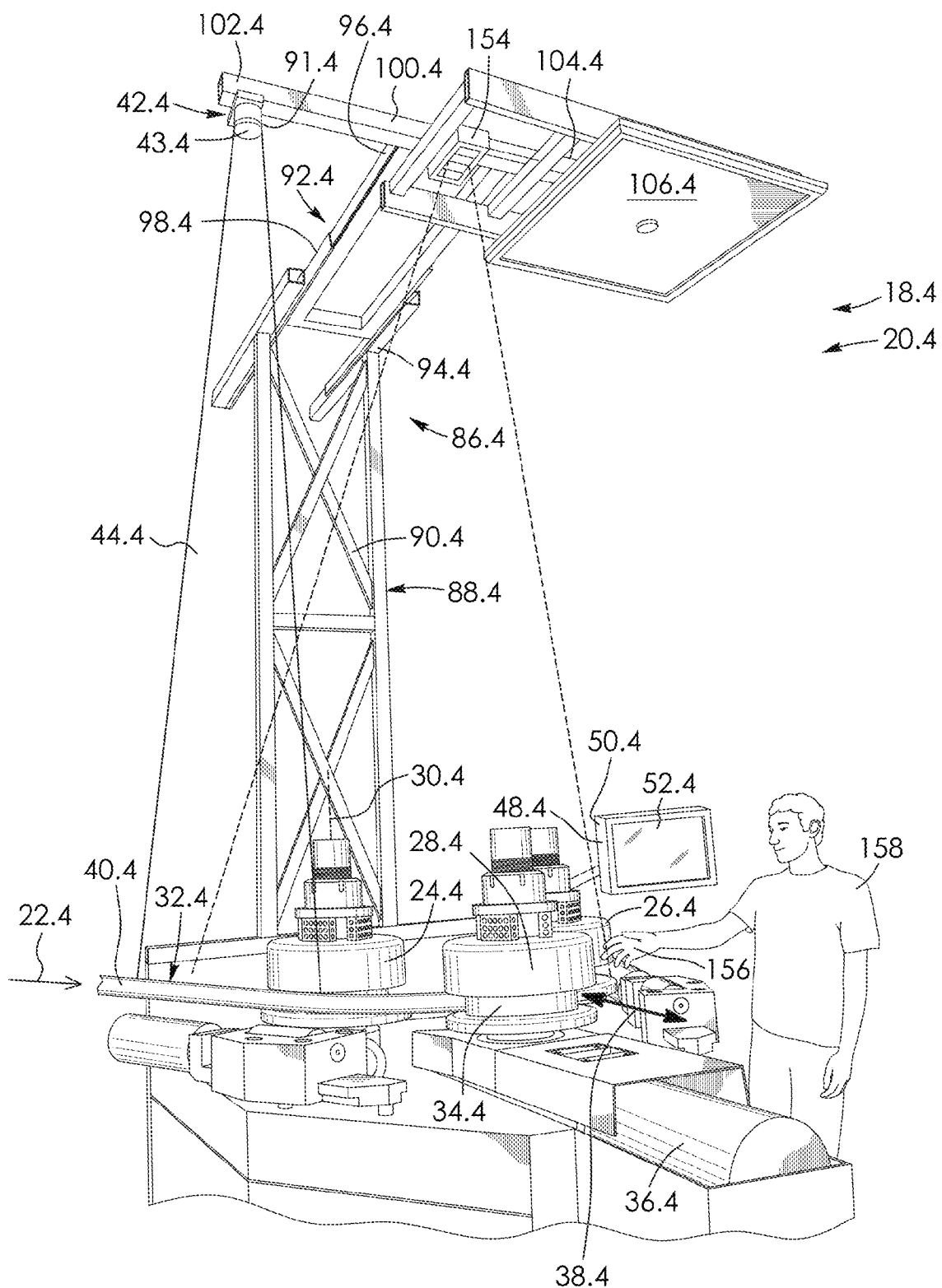
FIG. 15 is a side perspective view of a bending assembly according to a fifth aspect, including a bending apparatus, tubing to be bent, a camera positioned above the tubing, and a motion detector positioned above the bending apparatus.

FIG. 15 shows a system 18.4, bending assembly 20.4 and bending apparatus 22.4 according to a fifth aspect. Like parts have like numbers and functions as the system 18.2, assembly 20.2 and apparatus 22.2 shown in FIGS. 7 to 13 with the decimal extension ".4" replacing decimal extension ".4" and being added to numbers shown in FIGS. 7 to 13 not previously having decimal extensions. System 18.4, assembly 20.4 and apparatus 22.4 are substantially the same as system 18.2, assembly 20.2 and apparatus 22.2 shown in FIGS. 7 to 13 with the following exception.

The system and assembly further include a motion detector 154. The motion detector is connected to support member 100.4 at a location between ends 102.4 and 104.4 thereof. The motion detector 154 is thus positioned adjacent to the bending apparatus 22.4. The motion detector communicates a signal to the microprocessor 48.4 upon detecting a person, in this example the hand 156 of an operator 158 in the vicinity of the bending apparatus 22.4, in this example near rollers 26.4 and 28.4. The microprocessor operatively shuts down the bending apparatus upon receiving this signal from the motion detector 154. Motion detectors per se, including their parts and various functions, are known to those skilled in the art and therefore will not be described in further detail. In an alternative embodiment the motion detector is incorporated into camera 42.4 instead of being a separate component.

It will be appreciated that many variations are possible within the scope of the invention described herein. For example, instead of a roll bending apparatus for tubing, the invention as herein described may be used in association with box and pan brakes, brake presses, plate rollers, and other types of bending apparatuses for various other types of workpieces. Instead of tubing, the invention as herein described may be used to bend other elongate members.

There may be a camera at both ends of support member 100 of FIG. 7 according to a further aspect. The cameras so configured may provide for further redundancy and thus quality control and accuracy. This may be particularly useful for elliptical bending of workpieces.

The assembly as herein described may be sold in a preassembled kit form or may be sold in individual component form for retrofitting onto existing bending systems.

It will be understood by someone skilled in the art that many of the details provided above are by way of example only and are not intended to limit the scope of the invention which is to be determined with reference to at least the following claims.

What is claimed is:

1. A method of bending a workpiece using a bending apparatus, an image-capturing device and a processor, the method comprising:
    bending a portion of the workpiece so as to form a curved portion of the workpiece, said curved portion of the workpiece having a curvature and a first longitudinal periphery, the first longitudinal periphery being the inside curved edge of the workpiece;
    capturing an image of said first longitudinal periphery of said curved portion of the workpiece with the image-capturing device;
    outputting said image to the processor;
    identifying through the processor a plurality of measuring points which are spaced-apart along said first longitudinal periphery of the curved portion of the workpiece; and
    determining through the processor a first estimated curvature based on said measuring points, retaining those one or more measuring points that fit along the first estimated curvature within a first pre-set tolerance, retaining one or more measuring points that are positioned to overlay a portion of the image showing the workpiece and retaining one or more measuring points that are positioned between the portion of the image showing the workpiece and the first estimated curvature,
    determining through the processor a second estimated curvature based on said measuring points so retained, retaining one or more measuring points that fit along the second estimated curvature within a second pre-set tolerance that is smaller than the first pre-set tolerance, retaining one or more measuring points that are positioned to overlay the portion of the image showing the workpiece and retaining one or more measuring points that are positioned between the portion of the image showing the workpiece and the second estimated curvature, disregarding all other measuring points and using at least some of the measuring points so retained to determine the curvature of the curved portion of the workpiece.

2. The method as claimed in claim 1, the bending apparatus having a preprogrammed desired curvature for the curved portion of the workpiece, and the method further including the steps of:
    comparing through the processor the curvature of the curved portion of the workpiece with a desired curvature of the curved portion of the workpiece; and
    outputting from the processor to the bending apparatus an adjustment command when the absolute value of the difference between the curvature and the desired curvature is greater than a set threshold,
    the bending apparatus altering the extent to which the workpiece is bent upon receiving said adjustment command.

3. The method as claimed in claim 1 further including within the identifying step:
    identifying differences between adjacent pixels which reach a certain pre-set threshold to locate the first longitudinal periphery of the curved portion of the workpiece shown on said image.

4. The method as claimed in claim 1, the workpiece being tubing having a diameter, the curved portion having a second longitudinal periphery spaced-apart from the first longitudinal periphery, and the method further including within the identifying step:
    identifying through the processor a further plurality of spaced-apart measuring points along the second longitudinal periphery of the curved portion of the tubing that pair with the measuring points along the first longitudinal periphery of the curved portion of the tubing; and, within the determining the curvature step, determining distances of separation between respective ones of the measuring points so paired, retaining those measuring points so paired whose distances of separation are equal to the diameter of the tubing within a pre-set tolerance, and using at least some of the measuring points so paired and retained to determine the curvature of the curved portion of the tubing.

5. The method as claimed in claim 1, the workpiece having a thickness, the curved portion of the workpiece having a second longitudinal periphery spaced-apart from the first longitudinal periphery of the workpiece, and the method further including within the identifying step:

identifying through the processor a further plurality of spaced-apart measuring points along the second longitudinal periphery of the curved portion of the workpiece that pair with the measuring points of the first longitudinal periphery of the curved portion of the workpiece; and, within the determining the curvature step, determining distances of separation between respective ones of the measuring points so paired, retaining those measuring points so paired whose distances of separation are equal to the thickness of the workpiece within a pre-set tolerance, and using at least some of the measuring points so paired and retained to determine the curvature of the curved portion of the workpiece.

6. The method as claimed in claim 1, the image-capturing device having at least five megapixels, and the method including:

setting the first pre-set tolerance to equal to or less than one pixel, and setting the second pre-set tolerance to equal to or less than one half of a pixel.

7. The method as claimed in claim 1 further including within the determining the curvature step:

determining through the processor a third estimated curvature based on the measuring points retained after the disregarding of all other points, further retaining one or more measuring points that fit along the third estimated curvature within a third pre-set tolerance that is smaller than the second pre-set tolerance, retaining one or more measuring points that are positioned to overlay the portion of the image showing the workpiece and retaining one or more measuring points that are positioned between the portion of the image showing the workpiece and the third estimated curvature, disregarding all other points and using at least some of the measuring points so further retained to determine the curvature of the curved portion of the workpiece.

8. The method as claimed in claim 7, the image-capturing device being a camera having at least five megapixels, and the method including:

setting the first pre-set tolerance to equal to or less than one pixel, setting the second pre-set tolerance to equal to or less than one half a pixel and setting the third pre-set tolerance to equal to or less than one quarter of a pixel.

* * * * *